US011115302B1

(12) United States Patent
Sainanee

(10) Patent No.: US 11,115,302 B1
(45) Date of Patent: Sep. 7, 2021

(54) SELF-SERVICE METRIC PUBLICATION IN A COMPUTER NETWORK

(71) Applicant: Amazon Technologies, Inc., Seattle, WA (US)

(72) Inventor: Archak Sainanee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/133,396

(22) Filed: Sep. 17, 2018

(51) Int. Cl.
*H04L 12/26* (2006.01)
*H04L 12/24* (2006.01)
*H04L 29/08* (2006.01)
*G06F 16/245* (2019.01)
*G06F 16/958* (2019.01)

(52) U.S. Cl.
CPC ............ *H04L 43/08* (2013.01); *G06F 16/245* (2019.01); *G06F 16/958* (2019.01); *H04L 41/5032* (2013.01); *H04L 41/5067* (2013.01); *H04L 67/025* (2013.01)

(58) Field of Classification Search
CPC . H04L 43/08; H04L 41/5032; H04L 41/5067; G06F 16/245; G06F 16/958
See application file for complete search history.

(56) References Cited

U.S. PATENT DOCUMENTS

| | | | |
|---|---|---|---|
| 7,752,301 B1 * | 7/2010 | Maiocco | H04L 43/0817 709/224 |
| 8,560,539 B1 * | 10/2013 | Engebretsen | G06F 16/355 707/736 |
| 9,021,021 B2 * | 4/2015 | Backholm | H04L 43/065 709/203 |
| 9,128,779 B1 * | 9/2015 | Gladkikh | G06F 9/52 |
| 9,967,351 B2 * | 5/2018 | Maheshwari | H04L 41/5045 |
| 10,536,353 B2 * | 1/2020 | Gupta | G06F 3/0482 |
| 2007/0150489 A1 * | 6/2007 | Dettinger | G06F 16/245 |
| 2008/0177756 A1 * | 7/2008 | Kosche | G06F 11/3447 |
| 2008/0301086 A1 * | 12/2008 | Gupta | G06F 16/283 |
| 2011/0078108 A1 * | 3/2011 | Kumar | G06F 11/3495 707/602 |
| 2013/0072213 A1 * | 3/2013 | Agrawal | H04W 72/1231 455/452.2 |
| 2014/0229154 A1 * | 8/2014 | Leydon | H04L 51/10 704/2 |
| 2015/0242505 A1 * | 8/2015 | Uenoyama | G06F 16/951 707/722 |
| 2015/0281065 A1 * | 10/2015 | Liljenstolpe | H04L 12/4641 370/392 |
| 2015/0295765 A1 * | 10/2015 | Dickey | H04L 41/0816 709/220 |

(Continued)

*Primary Examiner* — Douglas B Blair
(74) *Attorney, Agent, or Firm* — Nicholson De Vos Webster & Elliott, LLP

(57) ABSTRACT

Techniques for self-service publication of metrics are described. A provider network includes metrics publications services. Aspects of the metrics publication services allow customers to generate customer-defined metrics from customer-defined queries of data sets. Such data sets may contain data related to software and/or hardware performance. Other aspects of the metrics publication services allow customers to make data sets available to metrics publications services, to identify available data sets, and to identify available metrics.

20 Claims, 7 Drawing Sheets

(56) References Cited

U.S. PATENT DOCUMENTS

| | | | |
|---|---|---|---|
| 2016/0066130 A1* | 3/2016 | Bosua | G05F 1/12 375/257 |
| 2016/0364487 A1* | 12/2016 | Bhat | G06F 16/972 |
| 2017/0171047 A1* | 6/2017 | Freishtat | H04L 43/08 |
| 2017/0264550 A1* | 9/2017 | Larose | H04L 47/24 |
| 2017/0289240 A1* | 10/2017 | Ghare | H04L 65/4069 |
| 2018/0270126 A1* | 9/2018 | Tapia | H04L 41/5067 |

* cited by examiner

| Publication Name 205 | Publication Identifier 210 | Publication Frequency (ms) 215 | Source and Query 220 | Computation 225 | Destination 230 |
|---|---|---|---|---|---|
| <Friendly Name> | pid-198A129F | 60000 | [ {<br>source:"ds-21345",<br>var:"Memory",<br>query:"SELECT MAX(readLatency) FROM memoryLatency WHERE timeStamp>DATEADD(mm, -1, GETDATE())"<br>},<br>{<br>source:"ds-12445",<br>var:"Network",<br>query:"SELECT MAX(networkLatency) FROM networkLatency WHERE timeStamp>DATEADD(mm, -1, GETDATE())"<br>},<br>{<br>source:"ds-12345",<br>var:"Query",<br>query:"SELECT MAX(queryLatency) FROM moduleA WHERE timeStamp>DATEADD(mm, -1, GETDATE())"<br>} ] | [ {<br>calc:"X=Query - Network"<br>} ] | [ {<br>sink:"destinationA",<br>publication:["Memory","Network"],<br>parameters:["<CustomerId>"]<br>},<br>{<br>sink:"destinationB",<br>publication:["X","Memory"]<br>} ] |

DATA SET IDENTIFIER 250
QUERY RESULT VARIABLE 251
QUERY 252
COMPUTATION(S) 255
DESTINATION IDENTIFIER 260
PUBLICATION VARIABLES 261
DESTINATION PARAMETERS 262

*FIG. 2*

SELF-SERVICE METRIC PUBLICATION IN A COMPUTER NETWORK

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple customers by providing each customer with one or more virtual machines hosted by the single physical computing machine, with each such virtual machine being a software simulation acting as a distinct logical computing system that provides customers with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple customers by providing each customers with a virtualized data store which may be distributed across multiple data storage devices, with each such virtualized data store acting as a distinct logical data store that provides customers with the illusion that they are the sole operators and administrators of the data storage resource.

BRIEF DESCRIPTION OF DRAWINGS

Various embodiments in accordance with the present disclosure will be described with reference to the following figures.

FIG. 2 is a diagram illustrating an exemplary publication definition according to some embodiments.

DETAILED DESCRIPTION

Figure 1:
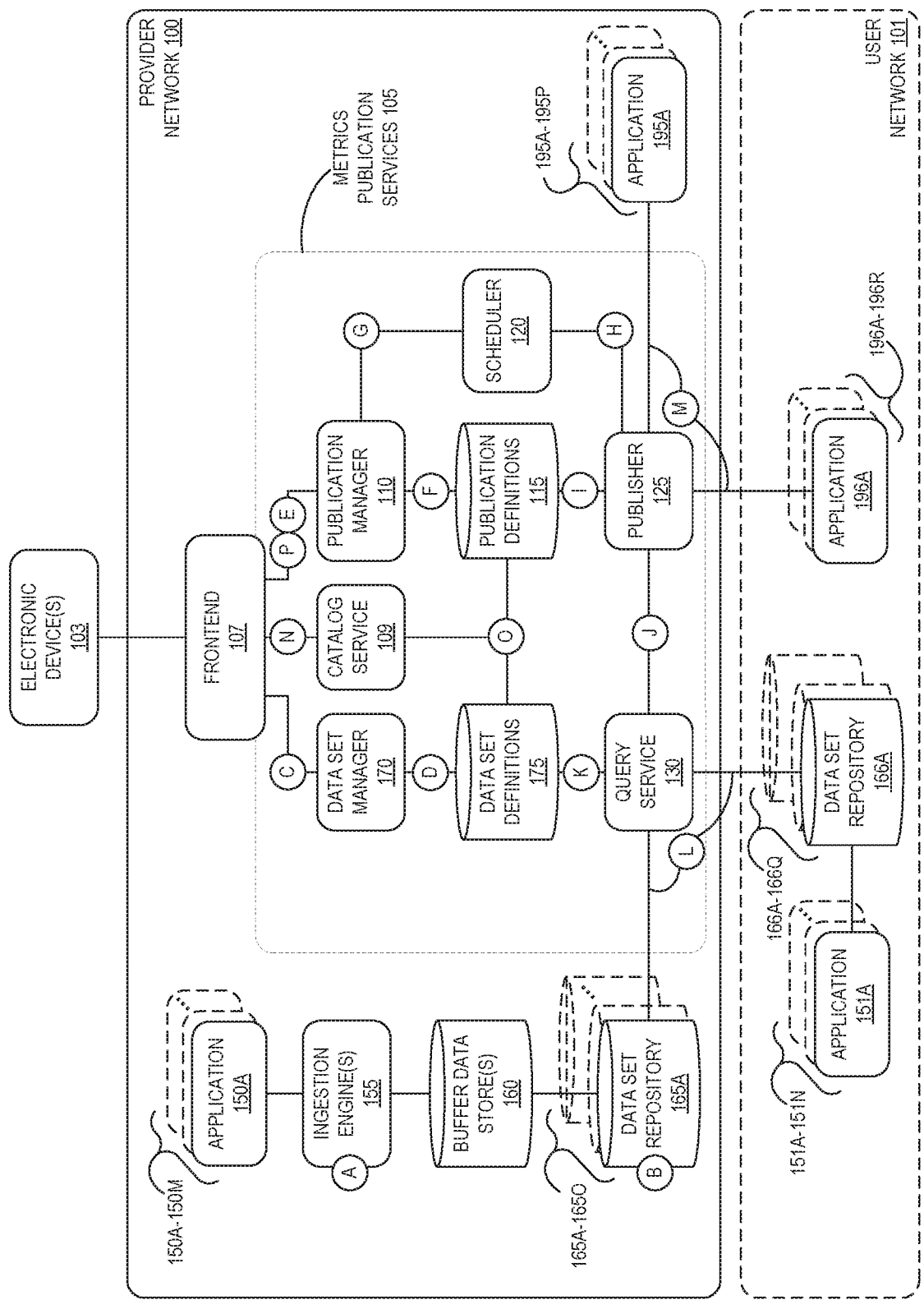
FIG. 1 is a diagram illustrating an environment for self-service metrics publication according to some embodiments.

Various embodiments of methods, apparatus, systems, and non-transitory computer-readable storage media that allow users of a provider network to define and publish metrics related to computer systems and applications are described. Metrics include operational metrics (e.g., metrics used by other computer systems or applications) and business metrics (e.g., metrics to inform user's business decisions). Metrics are generally derived from hardware or software diagnostic or performance data generated by the provider's or the user's software applications or programs. According to some embodiments, a provider network offers metrics publication services. Aspects of metrics publication services allow users to, amongst other things, make data sets available for use in generating metrics, define queries to retrieve data from the data sets used to generate a metric, optionally define computations to perform on retrieved data to generate a metric, define publication destinations for the generated metric, and discover available data sets and/or metrics. Based on a user-defined schedule, the metrics publication services retrieve data from the queries, generate the corresponding metrics, and publish the metrics to the destinations. Architecturally, the metrics publication services are implemented as lightweight software services within the provider network to reduce the latency associated with gathering and publishing user-specified operational or business metrics and to scale out for many users generating many metrics from many data sets.

For example, a user (or even the provider) may have one or more computer systems executing a set of applications that generate diagnostic or performance data. Application A might be running on one computer system in communication with application B running on another computer system and coupled via a network. Application A might include a function that requests data from application B over the network and perform some processing on the response from application B. The user might be interested in the latency associated with the processing of application A, but the available performance or diagnostic data of Application A is intertwined with the network latency and the processing time attributed to application B. To obtain the desired metric, the user identifies the data sets that contain the available processing times of application A and application B, and the network latency between the two computer systems to the metrics publication services. The user then identifies the queries to retrieve each of the three inputs and a computation to subtract the processing time of application B and the network latency from the processing time of application A. Aspects of the metrics publication services retrieve the performance data based on the queries, perform the computation, and publish the generated metric to any user-specified destinations. The process may repeat so that the user can monitor the performance of application A over time.

FIG. 1 is a diagram illustrating an environment for self-service metrics publication according to some embodiments. At a high level, a provider network 100 includes metrics publication services 105, aspects of which enable users to make data sets available, define metrics for publication, and to identify available data sets and/or metrics. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc.

In the embodiment illustrated in FIG. 1, the components of the metrics publication service 105 include a data set manager 170, a catalog service 109, a publication manager 110, a data set definitions data store 175, a publication definitions data store 115, a scheduler 120, a query service 130, and a publisher 125. While the components of the metrics publication service 105 are illustrated separately and described as performing certain operations, the components and operations of the metrics publication service 105 may be combined or further divided in other embodiments. As will be described in further detail below, the data set manager 170, the catalog service 109, and the publication manager 110 aid the user in making data sets available for use in generating metrics and specifying metrics for publication. The query service 130 fetches data from available data sets, and the publisher 125 generates and publishes the metrics. The source of the data in the data sets generally includes applications 150A-150M that output diagnostic or performance data, and the destination of the published metrics generally include applications 195A-195P that receive metrics for use either by an application 195 or a user.

In some embodiments, communications between the components illustrated in FIG. 1 are handled via messaging. Such messaging may be facilitated by, for example, application programming interfaces (APIs) offered by the software programs or applications associated with each of the illustrated components. Such APIs may define message formats and contents that the software programs accept. Messaging between the various components illustrated in FIG. 1 will be described in further detail below with reference to the encircled letters "A" through "P." In particular, circles A through D relate to enabling users to make data sets available, circles E through M relate to enabling users to define metrics for publication and the publication process, and circles N through P relate to enabling users to identify available data sets or metrics.

Prior to publishing metrics, users make the data used to generate metrics available to the metrics publication services 105. Applications 150A-150M generate hardware or software performance or diagnostic data. Applications 150 include software processes that perform various functions, including outputting the hardware or software performance or diagnostic data. The applications 150 may include low level software processes executing on computer systems that monitor or control the performance of components of the computer systems (e.g., CPU, network interface(s), memory, disk, etc.) or high-level software processes that monitor application performance or control application behavior (e.g., report processing times of subroutines, report latencies between receiving and servicing requests, report error counts, etc.). Applications 150 may be developed and controlled by different users, which may include internal users (e.g., provider employees that develop applications or services that the provider network 100 offers to external users) and external users (e.g., provider customers that host their own proprietary business solutions within the provider network 100).

The provider network 100 may employ virtualization technologies to host applications 150 and other applications or software programs, including aspects of the metrics publication service 105. Such virtualization technologies allow multiple "virtualized" computer systems, sometimes referred to as "compute instances," to execute applications or services while sharing the same underlying physical computer system. For example, an application or service may execute within a guest operating system (OS) environment on a virtual computer system that is hosted using a hypervisor or virtual machine manager. The hypervisor or VMM may or may not further operate on top of an underlying host OS environment that is executed within the underlying physical computer system. For example, some applications 150 include provider applications executed directly on physical computer systems within the provider network 100 to support the operation of the provider network 100. As another example, some applications 150 are user applications executed indirectly within hosted, virtualized environments. In addition to applications 150, the components of the metrics publication service 105 may be executed directly or indirectly, through virtualization technologies, on computer systems within the provider network 100.

As indicated above, circles A through D relate to enabling users to make data sets available to the metrics publication services 105. Prior to informing the metrics publication services 105 of the availability of a data set, the raw data from applications 150 is preprocessed into a form "queryable" by the metrics publication services 105 and stored in data set repositories 165. Each application 150 may generate data stored in one or more data set repositories 165, and each data set repository 165 may store data from one or more applications 150. In one embodiment, ingestion engines 155 preprocess raw data from applications 150 into a queryable form and stored the preprocessed data in buffer data stores 160 until it can be loaded into the data set repositories 165.

An ingestion engine 155 obtains raw data from an application 150 and preprocess the raw data into a format compatible with a data set repository 165, as indicated at circle A. Exemplary preprocessing operations include stripping or culling extraneous data from the raw data, converting the raw data from a semi-structured or unstructured format into a structured format, etc. Ingestion engines 155 may ingest new data according to some preset schedule or interval, depending on the rate and volume of data generated by the applications 150 and output the newly processed data to a buffer data store 160.

Buffer data stores 160 decouple the processing of the raw data by ingestion engines 155 from loading the processed data into data set repositories 165. Such decoupling may be desirable for situations where the associated data set repository 165 is processing other requests (e.g., from the query service 130 as described below) and unable to add the newly processed data to the data set as it is output from the ingestion engine 155. With the buffer data stores 160, destination data set repositories 165 can load the newly processed data during idle periods.

Ingestion engines 155 and buffer data stores 160 may be application-specific, with a separate ingestion engine 155 and/or buffer data store 160 used to buffer processed data from each of the applications 150A-150M. In some embodiments, the ingestion engine 155 and the buffer data store 160 are omitted and applications 150 send data directly to an associated data set repository 165.

The data set repositories 165 are databases that store data from applications 150, referred to herein as "data sets." The databases are queryable by the metrics publication services 105. Exemplary databases include relational and non-relational databases that are accessed via queries. In some embodiments, each data set repository 165 includes a database engine that vends an interface to handle transactions with the database (e.g., reads, queries, writes, inserts, etc.). Exemplary database engines include Structured Query Language (SQL) engines that comply with the SQL language. In some embodiments, the data set repositories 165 further include software (e.g., as a separate process or integrated with the database engine) to retrieve data from a buffer data store 160 during idle periods or periods of low database transaction activity (e.g., as measured relative to the number of transactions or the amount of data that the database engine can handle). The data set repositories 165 obtain the pre-processed data from the ingestion engines 155 (whether actively by retrieving the data from buffer data stores or passively in response to a write or insert operation from the ingestion engines), as indicated at circle B.

Although applications 150, ingestion engines 155, buffer data stores 160, and data set repositories 165 are illustrated within the provider network 100, in some embodiments, one or more of those components may be outside of the provider network. For example, applications 151A-151N and data set repositories 166A-166Q are similar to applications 150A-150M and 165A-165O but exist outside of the provider network. In this example, applications 151 and data set repositories 166 may be part of a user network 101 or other private network coupled to the provider network 100 via one or more intermediate networks (e.g., the internet (not shown)). For example, an external user of the provider network may have a corporate data center that includes applications 151 and data set repositories 166. The user may expose an interface to the data set repositories 166 that is accessible to the query service 130. Alternatively, an external user of the provider network may have applications 151 as part of their corporate data center and configure a data set repository 165 within the provider network 100 to receive data originating from applications 151.

In some embodiments, communications between the provider network 100 and outside devices, such as electronic device(s) 103, applications 151, and/or data set repositories 166 are handled via APIs that facilitate messaging across the boundary of the provider network 100. Some APIs may be part of "frontend" services, such as frontend 107, that facilitate communications to "backend" services, which, in some embodiments, include metrics publication services 105. For example, the frontend 107 may expose APIs that allow external users to interact with the data set manager 170, the catalog service 109, and the publication manager 110. Frontend 107 may further expose APIs that allow internal users (with traffic originating within the provider network 100) to interact with backend services. These API-based interactions may occur via a web-browser based interface, a command-line interface (CLI), software development kit (SDK) integrations, etc. In addition to facilitating communications with backend services, the frontend 107 may perform access control checks to verify the identity of users and their associated permissions to backend services.

To make a data set in a data set repository 165 available to the metrics publication services 105, a user registers the data set with the metrics publications service 105. To do so, a user causes an electronic device 103 to send a message to frontend 107 to register a data set repository 165. For example, the frontend 107 may include a registerDataSet API function that takes as parameters details regarding the data set being registered, such as a parameter identifying a data set repository 165, 166 and others described below. Upon receiving a message that includes a registerDataSet API function call, the frontend 107 sends a message to a data set manager 170 to register the data set repository, as indicated at circle C.

The data set manager 170 registers and unregisters data sets that are queryable by the metrics publication services 105. In some embodiments, the data set manager 170 registers data sets as entries in the data set definitions data store 175. Such entries may be referred to as data set definitions. Each data set is identified by a data set identifier assigned by the data set manager 170 upon registration to uniquely identify the data set in the data set definitions data store 175. The assigned data set identifier may be returned to the frontend 107 to relay the data set identifier to the electronic device 103 that initiated the registerDataSet API function call.

Upon receiving a message from the frontend 107 to register a data set, the data set manager 170 assigns a data set identifier to the data set and creates an entry in the data set definitions data store 175 for the new data set definition, as indicated at circle D. An exemplary data set definition includes a field that identifies the data set repository 165, 166 that stores the data set (e.g., a network address, a resource identifier, etc.), a field that identifies how to access the data set (e.g., whether the data set repository has a SQL, SQL++, or other type interface), and one or more fields that identify the available data within the data set (e.g., by referencing or based on a database schema, etc.).

In some embodiments, a user can register multiple data set repositories 165, 166 that contain the data set under a single data set identifier. The different data set repositories 165, 166 might have different performance characteristics (e.g., high latency, high throughput versus low latency, low throughput). In some embodiments, a data set definition further includes fields for a user-specified name and a user-specified description and, if the user shares the data set with other users, a field that identifies the sharing of the dataset with other users of the provider network (e.g., whether publicly available or shared with a specific group of users). Other fields include performance or reliability characteristics of the repository or repositories that can be used to determine which data set repository to query when multiple data set repositories are registered, as described below.

In some embodiments, the data set manager 170 monitors the status of the data set repositories 165, 166 via a field in the corresponding entry in the data set definitions data store 175. The field indicates the status of the particular data set repository 165, 166 associated with the identified data set. The status may be a binary indicator (e.g., '1' corresponds to the repository being available and '0' corresponding to the repository being unavailable), or other encoded or descriptive value that reflects whether the operability of the data set repository 165, 166 is impeded (e.g., at reduced capacity due to query loading, due to not receiving any new data from applications 150, 151, etc.). Exemplary techniques for monitoring the status of data set repositories 165, 166 include data set repositories 165, 166 that send status messages to the data set manager 170 that indicate whether they are operating normally or abnormally (or operating at all), and the data set manager 170 sending messages to request the status of the data set repositories 165, 166 registered with the data set manager 170.

The values of user-specified fields associated with a data set identifier in a data set definition entry in the data set definitions data store 175 may be included as parameters to the registerDataSet API function call to the frontend 107 or in subsequent communications related to the registration of a data set between the data set manager 170 and the electronic device 103. Once a user has registered a data set with the metrics publication services 105, the user can use that data set to define metrics for publication.

As indicated above, circles E through M relate to enabling users to define metrics for publication and the publication process. To define metrics for publication, a user causes an electronic device 103 to send a message to frontend 107 to request the creation of a new metric. For example, the frontend 107 may include a createPublication API function that takes as parameters details regarding the metric being created and published. Upon receiving a message that includes a createPublication API function call, the frontend 107 sends a message to a publication manager 110 to create a publication, as indicated at circle E.

In response to receiving a message from the frontend 107 to create a new publication, the publication manager 110 creates an entry in a publication definitions data store 115 for the new publication definition, as indicated at circle F. The publication manager also assigns a publication identifier to the entry upon creation to uniquely identify the publication in the publication definitions data store 115. The assigned publication identifier may be returned to the frontend 107 to relay the publication identifier to the user that initiated the createPublication API function call.

FIG. 2 is a diagram illustrating an exemplary publication definition according to some embodiments. Such a publication definition represents the data that may be stored in an entry in the publication definitions data store 115. The values of the user-specified fields associated with a publication identifier in a publication definition entry in the publication definitions data store 115 may be included as parameters to the createPublication API function call to the frontend 107 or in subsequent communications related to the creation of a publication between the publication manager 110 and the electronic device 103 under control of the user.

As shown, a publication definition includes a publication name field 205, a publication identifier field 210, a publication frequency field 215, a source and query field 220, a computation field 225, and a destination field 230. The publication name field 205 allows the user to assign a descriptive name to a publication. The publication identifier field 210 includes the publication manager-assigned identifier associated with the publication definition and may serve as an index to the publication definitions data store 115. The publication frequency field 215 includes the user-specified frequency or schedule to publish the metrics defined in the publication definition. In the illustrated example, the publication frequency is represented in milliseconds, although in other embodiments the publication frequency may include additional specificity (e.g., every hour, every other day, Tuesdays at 2:17 pm, weekdays at 12:00 am, etc.).

In this example, the source and query field 220, the computation field 225, and the destination field 230 are represented as JavaScript Object Notation (JSON) arrays of objects. Each object in the source and query field 220 includes a data set identifier 250 that corresponds to a data set identifier assigned by the data set manager 170, a query result variable 251 to identify the variable to which to assign the result of the query for subsequent reference, and a query 252 that specifies the query to run against the identified data set, illustrated here in a SQL query format. Each object in the computation field 225 specifies a computation 255 that takes as inputs results of the queries (as assigned to the query result variables 251) and computes a new variable. The computation field 225 may be used to specify computations that are performed by the publisher 125 in addition to any computations that are embedded within the query and carried out by the data set repository 165, 166 (e.g., the "MAX" function illustrated in the query 252). Each object in the destination field 230 identifies a destination (e.g., applications 195, 196) with a destination identifier 260 (e.g., via a network address, process identifier, etc.), the publication variables 261 (which to the variables assigned with the query results or to the variables created as a result of computations). Optionally, the objects in the destination field 230 include destination parameters 262, which may be passed along with the published variables 261 to the identified destination. Note that the published data, whether obtained directly as a query result variable 251 or from a computation 255, correspond to metrics.

In the illustrated example, a publication has an assigned identifier "pid-198A129F" and is configured to publish metrics every minute (every 60,000 milliseconds). Three objects in the source and query field 220 identify three data sets to be queried: "ds-21345," "ds-12445," and "ds-12345," which correspond to data set identifiers assigned by the data set manager 170. Each object further includes a query, the results of which are assigned to the variables "Memory," "Network" and "Query." The computations 255 define a computed variable "X" that is the difference between the "Query" and "Network" latencies. Two objects in the destination field 230 include destination identifiers "destinationA" and "destinationB". The query result variables "Memory" and "Network" are published as metrics to "destinationA," and the computed variable "X" and the query result variable "Memory" are published as metrics to "destinationB." Note that while the illustrated embodiment shows the variable "X" as an implicit part of the computations 255 and the variables "Memory" and "Network" as explicit variables in the source and query object array, such variables as referenced in either field 220, 225 may be implicit or explicit and referenced in publication variables 261.

In some embodiments, a publication definition includes more or fewer fields. Other fields include a description field that allows a user to provide additional written description related to the publication to be associated with the publication definition (e.g., a description of how the metrics being computed, etc.) and a permissions field that allows a user to specify whether the metrics publication services 105 will make the publication definition available to other users of the provider network 100. Another exemplary field allows a user to specify performance requirements, such as an acceptable amount of delay between the beginning of a publication cycle and the actual publication of metrics. Another exemplary field allows a user to specify the desired reliability of the metrics (e.g., 99% delivery).

Returning to FIG. 1, the publication manager 110 sends a message to a scheduler 120, as indicated at circle G. The message indicates or requests that the scheduler 120 configure a process to initiate the publication of the metrics associated with a publication definition. In particular, the message includes a publication identifier and an indication of the user-specified frequency or schedule at which the scheduler 120 should initiate publications. The scheduler 120 tracks the user-specified publication frequency or schedule and initiating the publication process. When the scheduler 120 determines that it is time to initiate the publication, the scheduler 120 sends a message to the publisher 125 including the publication identifier, as indicated by circle H.

In some embodiments, the scheduler 120 will return a scheduler identifier to the publication manager 110 that the publication manager 110 can store with the corresponding publication definition in the publication definitions data store 115. The scheduler identifier identifies the particular scheduler process used to initiate publications associated with the publication definition included in the message from the publication manager 110 to the scheduler 120. The publication manager 110 can use the scheduler identifier to later disable those publications. For example, the frontend 107 may offer a disablePublication API function that takes as a parameter a publication identifier and causes the frontend 107 to send a message to the publication manager 110. Upon receipt of such a message, the publication manager 110 identifies the scheduler identifier associated with the identified publication definition and sends a message to the scheduler 120 to disable (or terminate) the scheduler process associated with the scheduler identifier.

The publisher 125 responds to messages from the scheduler 120 by initiating queries to obtain the data to calculate or that represent a metric, performing any calculations on the obtained data, and publishing the obtained or calculated metrics to the destinations. In some embodiments, the publication manager 110 configures the publisher 125 upon the creation of a new publication (not explicitly shown in FIG. 1). In other embodiments, the publisher 125 fetches information related to a publication from the publication definitions data store 115 based on the publication identifier contained in the message received from the scheduler 120, as indicated at circle I. In either case, the publisher 125 obtains information contained in the source and query field 220, the computation field 225, and the destination field 230 associated with the publication identifier in the publication definitions data store 115. The publisher 125 sends one or more messages to the query service 130, containing information from the source and query field 220 associated with the publication identifier, as indicated by circle J. The publisher 125 may send the query service 130 separate messages for each data set and associated query identified within the publication definition or a single message. Included in the message or messages from the publisher 125 to the query service 130 are a data set identifier 250 and query 252 pairs.

The query service 130 decouples the publisher 125 and the data set repositories 165. As a result, the query service 130 can persist and handle many queries associated with many different metrics publications while the publisher 125 can cease or pend operations after publication until it receives another message from the scheduler 120. Further, changes or updates to the program code that handles an interface to a data set repository 165, 166 are isolated to the query service 130. The query service 130 obtains information related to a data set from the data set definitions data store 175 based on a data set identifier contained in the message received from the publisher 125, as indicated at circle K. The query service 130 obtains an identification of the data set repository 165, 166 that includes the identified data set and issues the query to the corresponding data set repository 165, 166, as indicated at circle L. In cases where multiple data set repositories 165, 166 include the same data set, one of the data set repositories 165, 166 may be queried at random or chosen based on one or more user-specified parameters as described below with reference to FIG. 4. Upon receiving the response from the queried data set repository, the query service 130 sends a message including data contained in the response to the publisher 125.

Note that in some embodiments, the query service 130 obtains status information related to the data set repository 165, 166 containing the identified data set prior to issuing the query. If the status information indicates the data set repository 165, 166 is operating abnormally or overloaded, the query service 130 may defer issuing the query or reject the query (in the latter scenario, sending a responsive message to the publisher 125 that the query failed). In situations where a user has registered multiple data set repositories 165, 166 with a single data set identifier, the query service may check the status of the other data set repositories associated with the data set identifier and only defer or reject the query if the data is also unavailable in the other data set repositories.

As the publisher 125 receives responses from the query service 130, the publisher can perform any computations (as defined in the computation field 225) and publish metrics (whether computed or the direct result of a query) to destinations, as indicated at circle M. Destinations are defined in the destination field 230, and include applications 195A-195P within the provider network 100 and/or applications 196A-196R outside of the provider network 100 (e.g., within the user network 101). As was the case with applications 150, 151, applications 195, 196 are one or more software programs that perform various functions, including receiving metrics from the metrics publication services 105. Applications 195, 196 may be low level software processes executing on computer systems that control components of the computer systems (e.g., CPU, network interface(s), memory, disk, etc.) or high-level software processes that control application execution or behavior (e.g., manage a user's resources within the provider network, redirect traffic from one computer system to another computer system, aggregate metrics for the user, etc.) or store published metrics for access by the user. In some embodiments, an application 150, 151 that is the source of data in a queried data set may also be an application 195, 196 that is the destination of a metric resulting from that query. Further, in some embodiments, applications 150, 151, 195, and 196 may include other components illustrated in FIG. 1, such as data set repositories 165, 166 or components of the metrics publication service 105. For example, the query service 130 may generate performance or diagnostic data related to the duration of particular queries that can be used in publishing metrics related to the health of the metric publication service 105 or data set repositories 165, 166.

The order in which the publisher 125 publishes metrics may vary depending on the order in which the publisher 125 receives responses from the query service 130. For example, if the publication involves two queries resulting in two independent metrics, and if the query service 130 returns response data to one of the two queries, the publisher 125 can publish the corresponding metrics without waiting for response data to the remaining query.

As indicated above, circles N through P relate to enabling users to identify available data sets or metrics. In particular, the frontend 107 may include a getDataSets API function and a getDataPublications API function. Each function may take one or more user-specified parameters that can be used to identify a subset of the data sets or publications that are available to the user (e.g., search or filter parameters). Upon receiving a message that includes a getDataSets or getDataPublications API function call, the frontend 107 sends a message to the catalog service 109 to obtain responsive information, as indicated at circle N.

The catalog service 109 enables users to discover data sets (e.g., that the user can use to create new publications) or existing publications (e.g., for the user to subscribe to). In some embodiments, the data set manager 170 and/or the publication manager 110 send information related to registered data sets or newly created publications as part of the respective processing performed in response to the registerDataSet and createPublication API calls. The catalog service 109 maintains the received information and, based on the parameters of the getDataSets or getDataPublications API call, sends responsive information to the frontend to relay to the issuer of the call.

In the illustrated embodiment, the catalog service 109 has access to the data set definitions data store 175 and the publication definitions data store 115, as illustrated by circle O. Based on the parameters of the getDataSets or getDataPublications API call, the catalog service 109 sends responsive information to the frontend to relay to the issuer of the call. The responsive information may be determined by, for example, a keyword search performed by the catalog service 109. The responsive information may include, but is not limited to, descriptive fields associated with the entries in the data set definitions data store 175 or publication definitions data store 115 that matched the parameters of the getDataSets or getDataPublications API call. The responsive information may also include data set identifiers or publication identifiers to allow a user to refer to available data sets as part of creating new publications or to identify existing metrics the user can subscribe to. Using data set identifiers or publication identifiers obtained via the catalog service 109, the user can cause the electronic device 103 to send a message to the frontend 107 to create a new publication or subscribe to an existing publication, as indicated by circle O. For example, the electronic device can issue a createPublication API call, as described above, that includes the identified data set identifiers in the query or queries. As another example, the user may subscribe to an existing publication via a subscribePublication API function offered by the frontend 107. The subscribePublication function takes as parameters a publication identifier and one or more destination identifiers. Upon receiving a message that includes a subscribePublication, the frontend 107 sends a message to the publications manager 110 to update a publication definition by adding the identified destinations to the destinations field 230 (or equivalent) associated with the identified publication.

Figure 3:
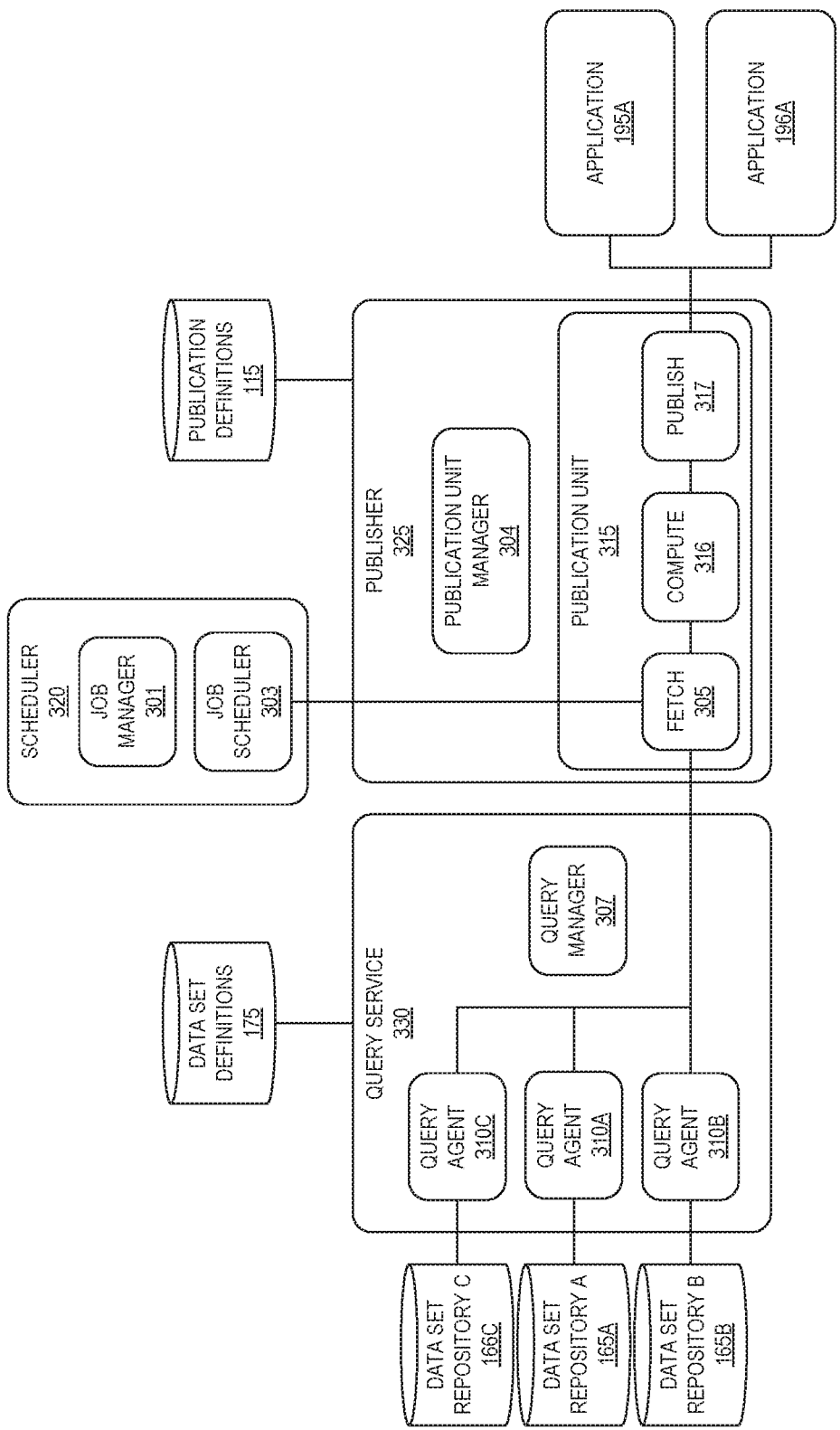
FIG. 3 is a diagram illustrating a query service, scheduler, and publisher according to some embodiments.

FIG. 3 is a diagram illustrating a query service, scheduler, and publisher according to some embodiments. In some embodiments, the query service, scheduler, and publisher are implemented as one or more software processes executing on computer systems within a provider network with or without the virtualization technologies described herein. In this example, metrics are published to applications 195A and 196A based on data obtained from data set repositories 165A, 165B, and 166C. As described with reference to circle G, the publication manager 110 (not shown) sends a message to a scheduler, such as scheduler 320, to create a process to initiate metric publication. Here, a job manager 301 handles the creation of such processes such as job scheduler 303. The job scheduler 303 tracks elapsed time to initiate publication of the corresponding metric(s) according to the publication frequency (e.g., every minute, every other day, the first day of a month, etc.). The tracking may be via one or more counter or timer processes, periodic inquiries to a remote time and date service, etc. and a record of the last time the metric(s) were published. The job manager 301 may create a process for each publication being handled by the metrics publication service 105. For example, the job manager 301 may configure another job tracker (not shown) that initiates other metrics publications associated with other publication identifiers. In some embodiments, each of the job trackers is a software process and each may be executed by different computer systems within the provider network 100.

The scheduler process that initiates publications, in this case the job scheduler 303, sends a message to a publisher such as publisher 325 to initiate the publication process, the message including a publication identifier (e.g., as described with reference to circle H). A publication unit manager 304 handles such messages, initiating a publication unit for each request if one has not already been initiated. A publication unit may not be initiated if it is the first time the publication unit manager 304 has encountered a particular publication identifier or, in some embodiments, because the publication unit 315 terminates after each metric publication.

The publication unit 315 includes a fetch unit 305, a compute unit 316, and a publish unit 317. As part of initializing the publication unit 315, the publication unit manager 304 obtains information related to the publication definition from the publication definitions data store 115 (e.g., as described with reference to circle I). Such information includes the data contained in the source and query field 220, computation field 225, and destination field 230 associated with the publication identifier. The publication unit manager 304 configures the fetch unit 305 with the obtained query information (e.g., the data set identifier 250, query result variable 251, and query 252 for each query object in the array in the source and query field 220). The publication unit manager 304 configures the compute unit 316 with the obtain computation information (e.g., computations 255). The publication unit manager 304 configures the publish unit 317 with the obtain destination information (e.g., the destination identifier 260, publication variables 261, and destination parameters 262 (if any) for each destination object in the array in the destination field 230). In some embodiments, each of the components of the publisher 325, including the publication unit manager 304 and the publication unit(s) (including the fetch, compute, and publish units within a publication unit) is a software process and each may be executed by different computer systems within the provider network 100 with or without using the virtualization technologies described herein. Each of the fetch, compute, and publish units may be independent processes that send messages to their respective input and output processes to request data, acknowledge the receipt of data, send data, confirm receipt of data, and retry request or send operations in the event of a failure. For example, the fetch unit 305 may issue requests to query agents and re-issue those requests if a response is not received within a timeout period. As another example, the publish unit 317 may attempt to send metrics to a particular destination application 195, 196 and re-attempt to send in the case of a transmission error or lack of an acknowledgment of receipt of the metrics from the destination.

In some embodiments, the fetch, compute, and/or publish units may be implemented as distributed processes executing on different computer systems within the provider network. For example, depending on the number of queries, the volume of the responsive data to the queries, the complexity or parallelism of the user-specified computations, and/or the number of destinations and total network throughput associated with publishing metrics, the publication unit manager 304 may instantiate distributed processes to perform the operations associated with the fetch unit 305, the compute unit 316, and/or the publish unit 317 as described herein.

In embodiments where the publication unit 315 does not terminate after publication, the publication unit manager 304 can cache the association between the publication unit 315 and the job scheduler 303 or can send the job scheduler 303 information identifying the publication unit 315 to use in sending future messages to initiate a metric publication (e.g., to send the message directly to the publication unit 315 instead of to the publication unit manager 304). In embodiments where the publication unit 315 is terminated after each metric publication, the publication unit manager 304 may temporarily cache the information retrieved from the publication definitions data store 115 to reduce the delay in subsequent initializations of a pipeline unit in response to a publication request from the job scheduler 303.

The fetch unit 305 sends one or more messages to the query service 330 (e.g., as described with reference to circle J). In the illustrated embodiment, the query service 330 includes a query manager 307 that correlates data set identifiers to the query agents 310 that handle the data set repository 165, 166 that include the identified data sets. In some embodiments, the query manager 307 maintains one data structure to correlates data set identifiers to query agents 310 and another data structure to correlate query agents 310 to data set repositories 165, 166. Upon receiving a data set identifier from a publisher (e.g., a fetch unit 305), the query manager 307 checks whether it can identify the query agent 310 associated with the data set identifier. If not, the query manager 307 obtains the information identifying the data set repository 165, 166 associated with the data set identifier in the data set definitions data store 175 (e.g., as described with reference to circle K). Based on that information, the query manager 307 checks whether a query agent exists that handles queries to the identified data set repository 165, 166. If not, the query manager 307 instantiates a new query agent and associates the identity of the new query agent with the corresponding data set repository 165, 166 and the data set identifier with the identity of the new query agent in the data structures. In some embodiments, a single query agent 310 may handle queries from separate publishers 125, 325 or fetch units 305. For example, the publisher 325 may have initialized multiple publication units (not shown) associated with different publications, but the queries associated with each publication are directed to a common data set handled by one of the query agents 310.

Once the query manager 307 has obtained the correlation between the data set identifier included in the message and a query agent 310, the query manager 307 can route messages received from the publisher 125, 325 or the fetch unit 305 to the appropriate query agent or direct the originator of the message to the appropriate query agent. For example, in some embodiments the fetch unit 305 sends a request for information identifying the query agents 310A-310C to the query manager 307. The request includes the data set identifiers that were part of the information in the source and query field 220 used to configure the fetch unit 305. The query manager 307 correlates the data set identifiers to the query agents 310A-310C and sends information identifying the query agents 310A-310C to the fetch unit 305. The fetch unit 305 sends the corresponding query to each of the query agents to issue the query to the corresponding data set repositories 165A, 165B, and 166C. In other embodiments, the fetch unit 305 sends the data set identifiers and queries to the query manager 307 which routes the queries to the appropriate query agents based on the correlations. The query manager 307 directs the query agents 310A-310C to send the responses to the queries to the fetch unit 305 or relays the responses to the fetch unit 305. Regardless of whether the fetch unit 305 sends the queries directly to the query agents 310 or to the query agents 310 via the query manager 307, the query agents 310A, 310B, and 310C submit the queries to the respective data set repositories 165A, 165B, and 166C (e.g., as described with reference to circle L).

In some embodiments, the query manager 307 may instantiate multiple query agents 310 per data set repository 165, 166. For example, the query manager 307 may monitor distribute the query load across the query agents. The query manager 307 may route queries from publishers 125, 325 or fetch units 305 to different query agents 307 associated with the same data set repository 165, 166, e.g., based on the number of outstanding queries issued to a particular query agent 307, using round-robin scheduling, etc.

In some embodiments, each of the query agents 310 and the query manager 307 is a software process and each may be executed by different computer systems within the provider network 100 with or without using the virtualization technologies described herein.

As the fetch unit receives responses from the query agents 310, the fetch unit passes the responses on to the compute unit 316 (e.g., using the query result variables 251). The compute unit 316 performs the computation or computations 255 and passes the query and computation results to the publish unit 317. Note that if a publication definition does not include any computations, the publication pipeline manager may not initialize a compute unit and configure a fetch unit to pass query results directly to a publish unit or initialize a compute unit to simply pass the data received from a fetch unit to a publish unit. Per the destination identifier(s) 260, publication variable(s) 261, and destination parameter(s) 262, the publish unit 317 sends metrics to the identified destinations (e.g., as described with reference to circle M).

Figure 4:
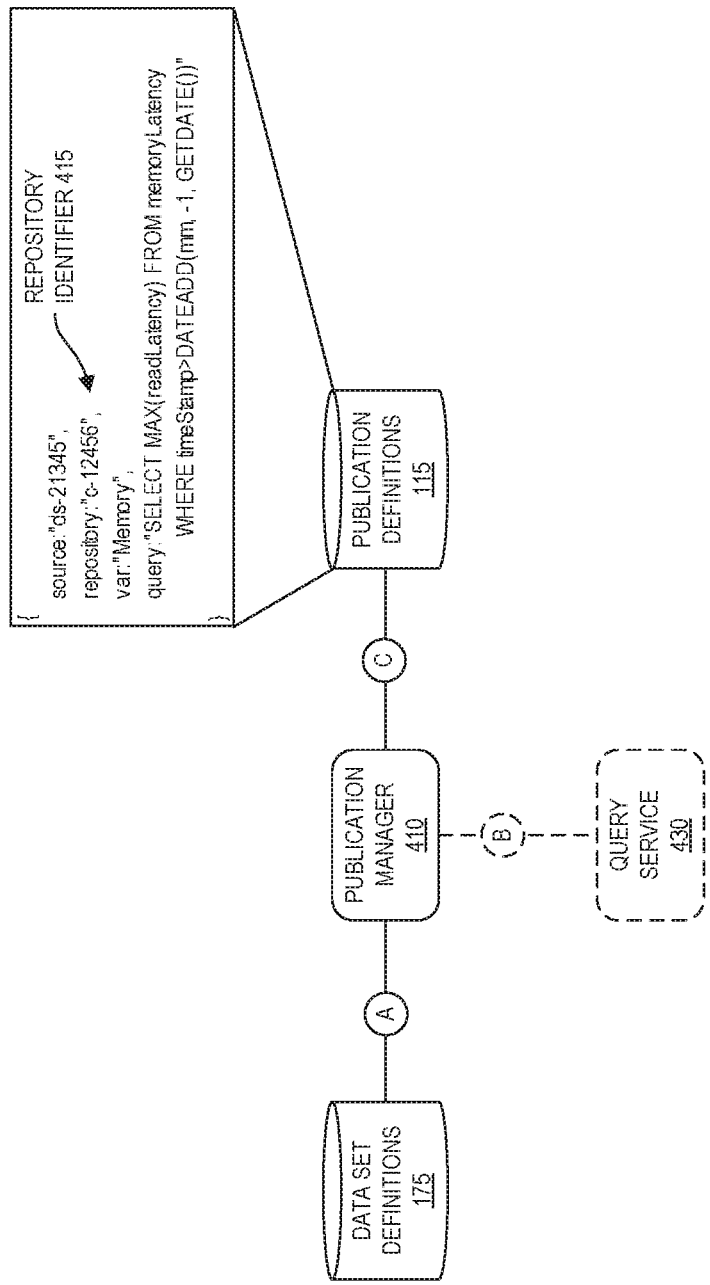
FIG. 4 is a diagram illustrating repository identification in an environment for self-service metrics publication according to some embodiments.

FIG. 4 is a diagram illustrating repository identification in an environment for self-service metrics publication according to some embodiments. As mentioned above, multiple data set repositories 165, 166 may be registered with a single data set identifier and store the same data set but offer different performance or reliability characteristics. For example, certain repositories 165, 166 may offer higher reliability but lower throughput or increased latency when processing queries, while other repositories 165, 166 are lower reliability with increased throughput or decreased latency. In such scenarios, the metrics publication services may determine which data set repository 165, 166 should be queried based on user-specified requirements within a publication definition. To make that determination, a publication manager 410, such as the publication manager 110 described above, is configured to evaluate the available data set repositories 165, 166 associated with a data set identifier to identify a data set repository 165, 166 that meets the user specified requirements. The evaluation of repositories will be described in further detail with reference to the encircled letters "A" through "C."

Initially, the publication manager 410 may check whether the user has specified any performance, reliability, or other requirements that may impact the selection of a data set repository when multiple repositories are available. Such requirements may have been submitted as part of the createPublication API function call or otherwise specified by the user. If so, the publication manager 410 attempts to satisfy those requirements based on the performance or reliability parameters associated with a repository in a data set definition or by obtaining actual performance or reliability data of the available repositories. At circle A, the publication manager 410 checks the data set definitions data store 175 to determine whether the data set has multiple associated data set repositories 165, 166. If multiple data set repositories 165, 166 exist for a data set, the publication manager 410 obtains any available performance or reliability characteristics associated with those repositories. The publication manager 410 may query the data set definitions data store 175 directly or indirectly via a data set manager, such as the data set manager 170 described herein.

In some situations, the publication manager 410 can select one of the multiple available data set repositories 165, 166 when the data set definition includes performance or reliability characteristics that can be evaluated against any user-specified requirements. For example, if the user specifies a 99% reliability requirement as part of a publication definition and the data set definition includes a particular repository that has an associated reliability characteristic that is 99% or more, the publication manager 410 updates the publication definition to include an identification of the particular data set repository 165, 166 that meets the user requirements, as indicated at circle C. For example, the publication manager 410 can update the publication definition source and query field 220 to add a repository identifier 415 that identifies the data set repository 165, 166.

In other situations, the publication manager 410 may be unable to select one of the available data set repositories 165, 166 based on the available performance or reliability characteristics and the user requirements. For example, the data set definitions data store 175 may not include or include partial performance or reliability characteristics for each of the available data set repositories 165, 166 associated with a data set. As another example, the user requirements may specify a performance requirement that is contingent on the complexity of the query and/or the resulting volume of data returned in response to the query. To evaluate performance, the publication manager 410 may initiate test queries against the multiple available data set repositories 165, 166 to evaluate their respective performance, as indicated at circle B. The publication manager 410 sends a message to a query service 430, such as the query service 330, to perform the user-specified query of the data set at each of the available data set repositories 165, 166 (e.g., via query agents 310). Upon receiving the responses to the queries, the publication manager 410 compares the performance of each of the data set repositories to the user specified requirement(s). To evaluate reliability, in some embodiments, the query service 430 tracks the overall reliability of the data set repositories 165, 166 over time as queries are issued (e.g., from query agents 310) and succeed or fail. Accordingly, the publication manager 410 may request the reliability metrics associated with each of the data set repositories 165, 166 from the query service 430. With the measured performance and/or reliability characteristics of each of the multiple data set repositories 165, 166 for a given data set, the publication manager 410 selects one that meets the user requirements and updates the publication definition to include a repository identifier 415, again as indicated at circle C.

In selecting a data set repository, the publication manager 410 evaluates the performance and/or reliability of the repository (whether as measured or as associated with a repository in a data set definition) against the user requirements. The user requirements may include, but are not limited to, the frequency of the publication, an allowable delay (or maximum latency) between the beginning of a publication cycle and the actual publication of metrics, the requisite reliability (e.g., in the case of operational metrics that affect the performance of downstream applications 195, 196), and/or the volume of the data returned in response to the query. In some embodiments, the publication manager 410 occasionally re-evaluates the multiple data set repositories against the user requirements (e.g., when a publication fails to meet the user requirements).

Note that a publisher, such as the publisher 125 or the publisher 325, may be configured to check for the presence of a repository identifier 415 within a source and query field 220 associated with a publication identifier. If one is present, the publisher can include the repository identifier in the message sent to a query service, such as the query service 130 or the query service 330, as described herein.

Figure 5:
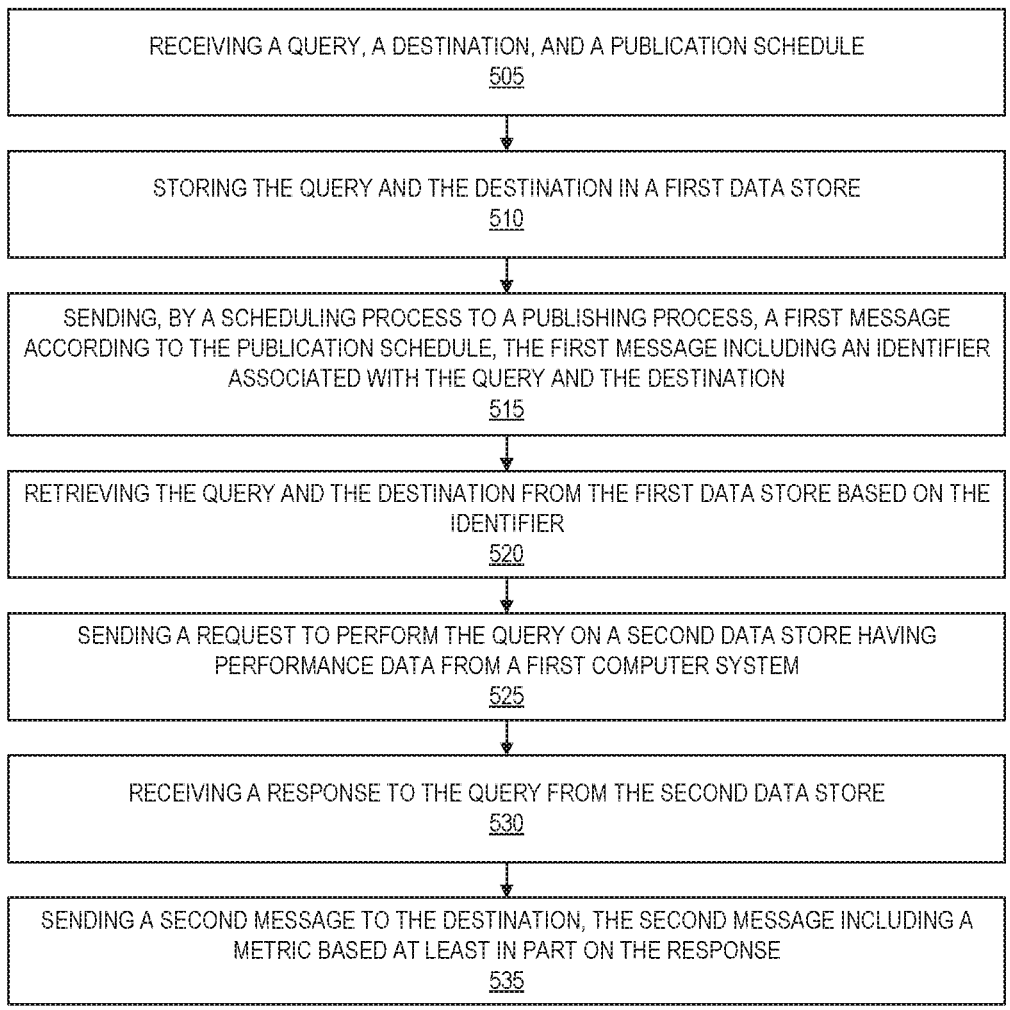
FIG. 5 is a flow diagram illustrating operations of a method for publishing metrics according to some embodiments.

FIG. 5 is a flow diagram illustrating operations of a method for publishing metrics according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the frontend 107, data set manager 170, catalog service 109, publication manager 110, scheduler 120 or 320, query service 130 or 330, and/or publisher 125 or 325 of the other figures.

The operations 500 include, at block 505, receiving a query, a destination, and a publication schedule. For example, a user can send a query, a destination, and a publication schedule to the publication manager 110 (e.g., by the frontend 107). For example, the createPublication API function described above allows users to define a new publication with the metrics publication service 105. The message may further include additional information such as computations, data set identifiers, etc. The query may be in the form of a SQL query or other query appropriate for the data set repository that contains the data set used in generating a metric. The destination may identify an application running on a computer system within the provider network 100 or the user network 101 (e.g., by a resource identifier used to identify virtualized compute instances, by a network address, etc.).

The operations 500 include, at block 510, storing the query and the destination in a first data store. As described above, in some embodiments the publication manager 110 tracks publications via entries in the publication definitions data store 115. Such entries may be indexed by a publication identifier assigned by the publication manager 110 upon creation of the entry and include information such as the query and the destination. An exemplary set of information associated with a publication definition is illustrated and described above with reference to FIG. 2.

The operations 500 include, at block 515, sending, by a scheduling process to a publishing process, a first message according to the publication schedule, the first message including an identifier associated with the query and the destination. A scheduling process, such as scheduler 120, 320 initiates the publication of metrics by sending a message to a publisher 125, 325. The messages are sent according to the schedule specified by the user when creating the publication. The schedule may be periodic (e.g., at a given frequency or interval) or based on the calendar (e.g., at a given time on certain days). As described above, the scheduler 125, 325 may send the publication identifier in the message to the publisher 125, 325.

The operations 500 include, at block 520, retrieving the query and the destination from the first data store based on the identifier. As explained above, information describing the publication of a metric may be stored as an entry in a data store such as the publication definitions data store 115. Each entry in the data store is uniquely assigned an identifier such as the publication identifier that can be used to obtain the information associated with the publication of a metric.

The operations 500 include, at block 525, sending a request to perform the query on a second data store having performance data from a first computer system and, at block 530, receiving a response to the query from the second data store. As described above, a publisher 125, 325 may send a message to a query service 130, 330 that includes the query. The query service 130, 330 sends the query to a data store, such as a data repository 165, 166, that includes the data set to be queried. The data store processes the query and returns the results to the query service 130, 330 which returns the results to the publisher 125, 325.

The operations 500 include, at block 535, sending a second message to the destination, the second message including a metric based at least in part on the response. As described above, a publisher 125, 325 may perform computations on the received results and publish metrics (whether computed or as received from the query) to one or more destinations, such as applications 195, 196.

Figure 6:
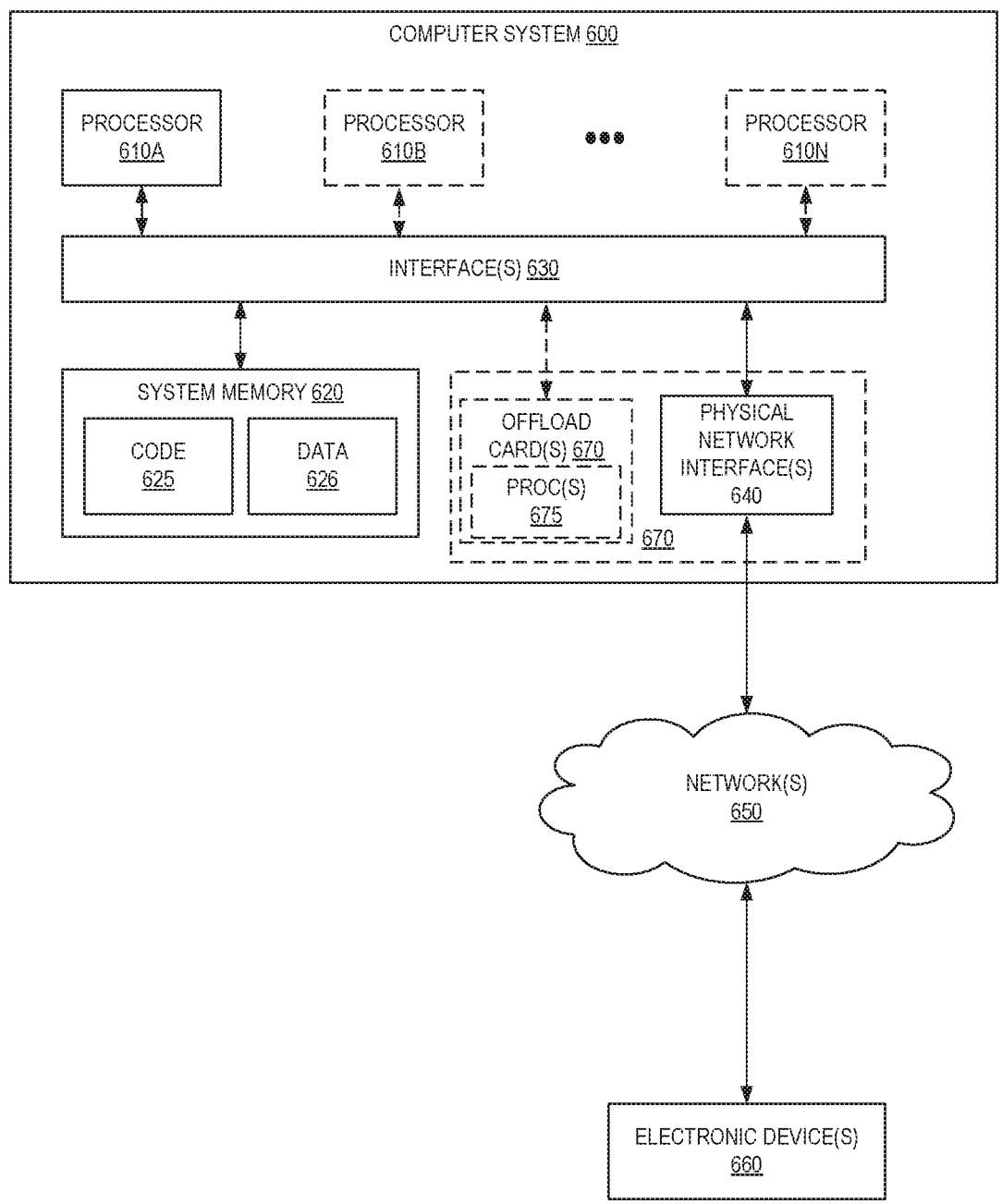
FIG. 6 is a block diagram illustrating an example computer system that may be used in some embodiments.

In some embodiments, a system that implements a portion or all of the techniques associated with publishing metrics as described herein may include a general-purpose computer system that includes or is configured to access one or more computer-accessible media, such as computer system 600 illustrated in FIG. 6. For example, components of metrics publication service 105, the applications 150, 151, 195, 196, the data set repositories 165, 166 may be implemented as software programs that are executed by one or more computer systems, such as computer system 600, that are coupled via the provider network 100, intermediate networks such as the internet, and/or user networks 101. In the illustrated embodiment, computer system 600 includes one or more processors 610 coupled to a system memory 620 via an input/output (I/O) interface 630. Computer system 600 further includes a network interface 640 coupled to I/O interface 630. While FIG. 6 shows computer system 600 as a single computing device, in various embodiments a computer system 600 may include one computing device or any number of computing devices configured to work together as a single computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 610 may commonly, but not necessarily, implement the same ISA.

System memory 620 may store instructions and data accessible by processor(s) 610. In various embodiments, system memory 620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices 660 attached to a network or networks 650, such as other computer systems or devices as illustrated in FIG. 1, for example. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 600 includes one or more offload cards 670 (including one or more processors 675, and possibly including the one or more network interfaces 640) that are connected using an I/O interface 630 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 600 may act as a host electronic device (e.g., operating as part of a hardware virtualization service) that hosts compute instances, and the one or more offload cards 670 execute a virtualization manager that can manage compute instances that execute on the host electronic device. As an example, in some embodiments the offload card(s) 670 can perform compute instance management operations such as pausing and/or un-pausing compute instances, launching and/or terminating compute instances, performing memory transfer/copying operations, etc. These management operations may, in some embodiments, be performed by the offload card(s) 670 in coordination with a hypervisor (e.g., upon a request from a hypervisor) that is executed by the other processors 610A-610N of the computer system 600. However, in some embodiments the virtualization manager implemented by the offload card(s) 670 can accommodate requests from other entities (e.g., from compute instances themselves), and may not coordinate with (or service) any separate hypervisor.

In some embodiments, system memory 620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 600 via I/O interface 630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

Figure 7:
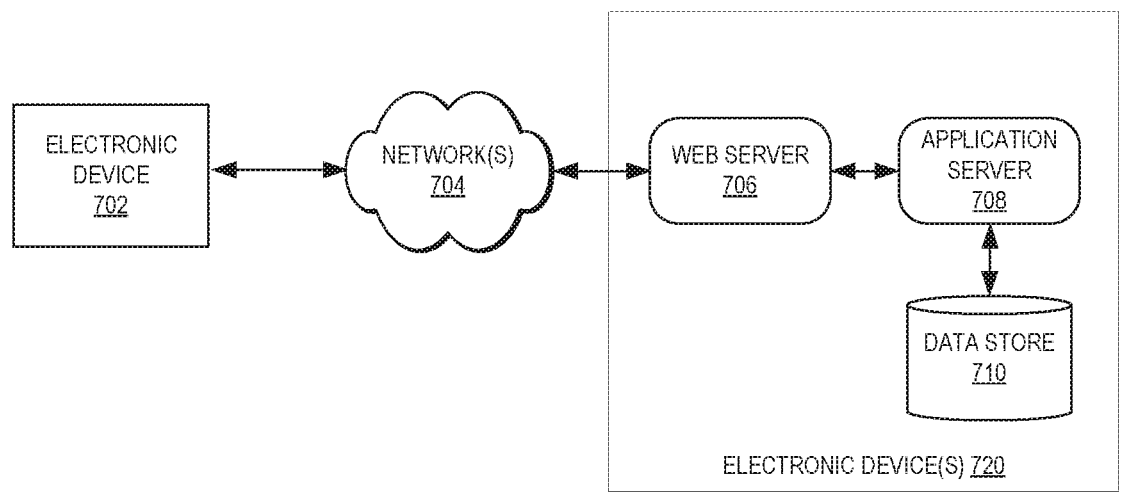
FIG. 7 illustrates an example of an environment for implementing aspects in accordance with various embodiments.

As discussed, different approaches can be implemented in various environments in accordance with the described embodiments. For example, FIG. 7 illustrates an example of an environment for implementing aspects in accordance with various embodiments. For example, in some embodiments messages between the electronic device(s) 103 and the frontend 107 are HyperText Transfer Protocol (HTTP) requests. The frontend 107 may include a web server (e.g., web server 706) that interfaces to an application service 708, such as the data set manager 170, catalog service 109, and/or publication manager 110. The users, via electronic devices, may interact with the provider network, including metrics publication services, via a web portal provided via the web server 706. As will be appreciated, although a web-based environment is used for purposes of explanation, different environments may be used, as appropriate, to implement various embodiments. The system includes an electronic client device 702, which may also be referred to as a client device and can be any appropriate device operable to send and receive requests, messages or information over an appropriate network 704 and convey information back to a user of the device 702. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 704 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 704 includes the Internet, as the environment includes a web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. Exemplary data stores include the data set definitions data store 175 and/or the publication definitions data store 115. The application server 708 can include any appropriate hardware and software for integrating with the data store 710 as needed to execute aspects of one or more applications for the electronic device 702 and handling a majority of the data access and business logic for an application. The application server 708 provides access control services in cooperation with the data store 710 and is able to generate content such as text, graphics, audio, video, etc., to be transferred to the client device 702, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 702 and the application server 708, can be handled by the web server 706. It should be understood that the web server 706 and application server 708 are not required and are merely example components, as structured code discussed herein can be executed on any appropriate device or host machine as discussed elsewhere herein.

A data store 710 can include several separate data tables, databases, or other data storage mechanisms and media for storing data relating to a particular aspect. The data store 710 is operable, through logic associated therewith, to receive instructions from the application server 708 and obtain, update, or otherwise process data in response thereto. In one example, a user might submit a search request for available data sets. In this case, the application server 708 verify the identity of the user and access the data set definitions data store 175 to obtain responsive information to the request, such as data set identifiers and any associated descriptions. The information can then be returned to the user, such as in a listing of results on a web page that the user is able to view via a browser on the user device 702. Information for a particular item of interest can be viewed in a dedicated page or window of the browser.

The web server 706, application server 708, and/or data store 710 may be implemented by one or more electronic devices 720, which can also be referred to as electronic server devices or server end stations, and may or may not be located in different geographic locations. Each of the one or more electronic devices 720 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the environment 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 150A-150M) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a metrics publication service of a service provider network, one or more messages indicating a request to create a publication of a metric value associated with one or computer systems within the service provider network, the request indicating a query provided by a user specifying how to obtain data, a formula indicating how to generate the metric value based at least in part on a result of the query, a destination identifier that identifies a destination where the metric value is to be sent, and a publication schedule indicating when the metric value is to be published;
   generating a publication definition in a first data store, the publication definition identifying a publication identifier, the query, the destination identifier, and the publication schedule;
   sending, by a scheduling process to a publishing process, a first message according to the publication schedule, the first message including the publication identifier;
   retrieving the query and the destination identifier from the first data store based on the publication identifier;
   sending a request to perform the query on a second data store having performance data from a first computer system;
   receiving a response to the query from the second data store;
   generating, by the publishing process, the metric value based at least in part on the response and the formula; and
   sending, by the publishing process, a second message to the destination, the second message including the metric value.

2. The computer-implemented method of claim 1, wherein the scheduling process is executed by a second computer system, the publishing process is executed by a third computer system, and the second computer system and the third computer system are both implemented as part of the metrics publication service of the service provider network.

3. The computer-implemented method of claim 2, wherein the formula indicates a user-specified computation.

4. A computer-implemented method comprising:
   receiving, at a metrics publication service of a service provider network, one or more messages indicating a request to create a publication of a metric value associated with one or computer systems within the service provider network, the request indicating a query provided by a user specifying how to obtain data, a formula indicating how to generate the metric value based at least in part on a result of the query, a destination identifier that identifies a destination where the metric value is to be sent, and a schedule indicating when the metric value is to be published;
   sending, by a scheduling process of the metrics publication service to a publishing process of the metrics publication service based on the schedule, a first message to initiate the publication of the metric value, the first message including a publication identifier;
   obtaining, by the publishing process based on the publication identifier, the query and the formula;
   sending, by the publishing process, a first request to perform the query;
   receiving, by the publishing process, a response to the first request;
   generating the metric value based on the formula and the response; and
   sending the metric value to the destination.

5. The computer-implemented method of claim 4, wherein the generating of the metric value and the sending of the metric value are performed by the publishing process of the service provider network.

6. The computer-implemented method of claim 5, wherein the generating of the metric value comprises performing a user-specified computation according to the formula and wherein the user is a customer of the service provider network.

7. The computer-implemented method of claim 4, wherein the method further comprises:
   generating a publication definition, the publication definition being associated with the publication identifier, the query, the formula, the schedule, and the destination identifier; and
   sending the publication identifier to an electronic device outside of the service provider network in response to a second request from the electronic device.

8. The computer-implemented method of claim 7, wherein the query is associated with a plurality of identifiers of a plurality of data sets.

9. The computer-implemented method of claim 8, wherein the formula indicates that values obtained from the plurality of data sets are to be used to generate the metric value.

10. The computer-implemented method of claim 7, wherein the publication definition further identifies at least one of a user-specified publication performance requirement or a desired metric reliability amount.

11. The computer-implemented method of claim 4, wherein the formula indicates how to generate the metric value and one or more other metric values, and wherein the method further comprises sending the one or more other metric values to the destination identified by the destination identifier in the one or more messages.

12. The computer-implemented method of claim 4, wherein the metric value is based at least in part on application performance data of a first computer system.

13. The computer-implemented method of claim 12, wherein an identifier of a second destination is received from a second user of the service provider network, wherein the method further comprises sending the metric value to the second destination.

14. The computer-implemented method of claim 4, wherein the query indicates that a data set is to be queried from an electronic device that is outside of the service provider network.

15. A system comprising:
a first one or more electronic devices to implement a scheduler service, the scheduler service including instructions that upon execution cause the scheduler service to:
send a first message including an identifier of an entry in a data store based on a schedule indicating when a metric value is to be published; and
a second one or more electronic devices to implement a publisher service, the publisher service including instructions that upon execution cause the publisher service to:
receive the first message including the identifier of the entry;
retrieve, from the data store based on the identifier, a query and a formula and a destination identifier that identifies a destination, wherein the query was provided by a user and specifies how to obtain data, the formula indicates how to generate the metric value based at least in part on a result of the query, and the destination is where the metric value is to be sent;
send a first request to perform at least a part of the query on a data set associated with the destination identifier;
receive a response to the first request;
generate the metric value based on the response to the first request and the formula; and
send a second message to the destination, the second message including the metric value.

16. The system of claim 15, wherein the first one or more electronic devices are within a service provider network and wherein the publisher service further includes instructions that upon execution cause the publisher service to:
send the destination identifier to a third electronic device that is outside of the service provider network in response to a second request from the third electronic device.

17. The system of claim 15, wherein the query is further associated with one or more other data sets, and wherein the instructions further cause the second one or more electronic devices to send one or more other requests to perform at least another part of the query.

18. The system of claim 15, wherein the formula indicates how to generate the metric value and one or more other metric values, and wherein the publisher service further includes instructions that cause the publisher service to send the one or more other metric values to one or more other destinations.

19. The system of claim 15, wherein the generation of the metric value is further based at least in part on application performance data of a first computer system.

20. The system of claim 19, wherein the metric value is a latency amount associated with the application involving the first computer system and a second computer system.

* * * * *